(12) United States Patent
Akopian

(10) Patent No.: US 6,573,799 B1
(45) Date of Patent: Jun. 3, 2003

(54) CLOCK SYSTEM AND CORRESPONDING METHOD FOR PROVIDING A CLOCK TIME ACCOUNTING FOR SYSTEMATIC ERROR

(75) Inventor: David Akopian, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/016,655

(22) Filed: Dec. 12, 2001

(51) Int. Cl.[7] .................................................. H03B 1/00
(52) U.S. Cl. ..................... 331/64; 342/350; 342/352; 342/357.01; 342/357.06; 342/357.1; 342/357.12; 701/213; 701/214
(58) Field of Search .............................. 331/44, 64, 74, 331/78, 158, 175; 342/350, 352, 357.01–357.17; 701/200, 207, 213, 214

(56) References Cited

U.S. PATENT DOCUMENTS 5,155,695 A * 10/1992 Stein ........................... 702/178
5,315,566 A * 5/1994 Stein ............................ 368/46
6,473,694 B1 * 10/2002 Akopian et al. ............. 701/213

OTHER PUBLICATIONS

"The Kalman Filter: Navigation's Integration Workhorse", by Larry J. Levy, in GPS World, Sep. 1997, pp. 65–71.

* cited by examiner

Primary Examiner—David C. Mis
(74) Attorney, Agent, or Firm—Ware, Fressola, Van Der Sluys & Adolphson LLP (57) ABSTRACT

Method for accounting for factors (such as temperature) causing systematic errors (time-varying or constant) in a clock, such as a clock used in a ranging receiver (for use with a positioning system such as the Global Positioning System), and a corresponding clock system (including a clock and a filter such as a Kalman filter) for providing clock time and error, used for example in a ranging receiver. The invention adds new state vector components to account for systematic error. The process update equation used in the navigation solution is accordingly extended to include the additional components of the state vector.

18 Claims, 4 Drawing Sheets

CLOCK SYSTEM AND CORRESPONDING METHOD FOR PROVIDING A CLOCK TIME ACCOUNTING FOR SYSTEMATIC ERROR

CROSS REFERENCE TO RELATED APPLICATIONS

Reference is made to co-filed U.S. application entitled METHOD FOR PROVIDING A MULTIPLE-CLOCK MODEL FOR USE IN A RANGING RECEIVER AND A RANGING RECEIVER USING SUCH A MODEL, Ser. No. 10/016,654, filed on even date herewith, with U.S. Express Mail No. EV 005 523 931 US.

The above referenced co-filed application is assigned to the present assignee and filed on the same date hereof. The subject matter of the above referenced co-filed application is hereby incorporated by reference.

FIELD OF THE INVENTION

The present invention relates to CDMA (Code Division Multiple Access) spread spectrum receivers, and more particularly to tracking in fast acquisition GPS (Global Positioning System) receivers.

BACKGROUND OF THE INVENTION

Spread spectrum communication in its basic form is a method of taking a data signal used to modulate a sinusoidal carrier and then spreading its bandwidth to a much larger value, e.g. in a global positioning system (GPS) application, by multiplying a single-frequency carrier by a high-rate binary (−1,1) pseudo-random noise (PRN) code sequence known to GPS users. Thus, the signal that is transmitted includes a data component, a PRN component, and a (sinusoidal) carrier component.

At the receiver, a synchronized replica of the transmitted PRN code is required to de-spread the data sequence. Initial synchronization, called acquisition, is followed by fine synchronization, which is called tracking.

In a ranging receiver used by a user to determine the position of the user based on the distance of the receiver from GPS satellites, in good signal conditions a range measurement called pseudorange is determined from information provided by tracking channels of the receiver and also from navigation data sent by each of the satellites and decoded by the receiver.

The GPS positioning system relies on the ranging receiver being able to reference to one clock the time when it receives ranging signals from each of the different satellites, and the time the GPS satellites transmitted the ranging signals (and more specifically, a particular fragment of a ranging signal, called here the target signal fragment). The ranging receivers do not, however, as a matter of economics, use clocks that can be synchronized with the clock used by the GPS or the clocks used by the different GPS satellites. The clocks of ranging receivers are based on relatively inexpensive oscillators whose frequency varies, changing permanently in some situations, and changing only temporarily in others. Some causes are categorized as deterministic or causal (e.g. temperature, causing a time-varying error; in crystal clocks, imperfections in the crystal used by the clock, causing a constant error, and aging of the crystal, causing an error that increases or decreases monotonically with time; magnetic fields, causing a time-varying error; and systematic drift in clocks besides only crystal clocks) and some as non-deterministic (i.e. random or noise-like causes, such as random walk and so-called flicker noise).

In many navigation systems, Kalman filtering or similar techniques are used to determine a track for a receiver in which errors due to deficiencies in the local oscillator (and due to other sources of error as well) are smoothed out. The tracking is performed by having one or another type of navigation filter use an appropriate model of clock behavior. Conventional models of clock behavior are usually based on random, noise-like changes in frequency measured in the time domain; systematic changes are interpreted as random fluctuations (albeit on a longer time scale than actual random fluctuations), and the process covariance matrix in state equations used by the navigation filter is changed to account for such fluctuations.

What is needed is an improved model of clock behavior for use by a navigation filter (such as a Kalman filter), a model that incorporates systematic changes in frequency due to systematic causes, such as for example temperature or other environmental effects, not as random fluctuations, but as actual systematic changes.

SUMMARY OF THE INVENTION

Accordingly, in a first aspect of the invention, a method is provided for estimating a current state of a clock having a clock phase indicating a value for time, the method including: a step of providing a clock measurement indicating information about the clock; and a step, responsive to the clock measurement, for determining the estimate of a current state of the clock using a state filter adapted to use a four-component state including as components a clock phase component and a clock fractional frequency component, and also including a clock error component and a clock error rate component, and further adapted to use a measure of four-state process noise covariance.

In accord with the first aspect of the invention, the clock measurement may indicate information about the clock phase and clock fractional frequency. Further, the measure of process noise covariance may be a process noise covariance matrix, and the process noise covariance matrix may include as diagonal terms respective variances in the values for each of the four components of the four-component state. Still further, the four-state process noise covariance matrix may be based on a definition of a process noise covariance matrix Q given by, $$Q = E(w_k w_k^t)$$

where $E(\ldots)$ indicates taking the mathematical expectation of the indicated argument, and where the $w_k$ is a four-component vector indicating process noise. Also, still even further, the four-state process noise covariance matrix may be derived from a two-state process noise covariance for a two-state clock model in a way that preserves the components of the process noise covariance for the two-state clock model, regardless of the manner in which the components of the process noise covariance for the two-state clock model are defined. In other applications where the clock measurement indicates information about the clock phase and clock fractional frequency, the state of the ranging receiver may include as components the clock phase component, the clock fractional frequency component, the clock error component, and the clock error rate component, and may also include either a position component or a velocity component indicating either the position or velocity of the ranging receiver, respectively.

Also in accord with the first aspect of the invention, the step for determining the estimate of a current state of the clock may be performed as part of a step of providing an estimate of a current state of a ranging receiver used in conjunction with beacons of a positioning system, and the method may further comprise a step of providing pseudoranges from the beacons of the positioning system.

In a second aspect of the invention, a clock system is provided for giving an estimate of a current state of a clock (a component of the clock system), the clock system including: the clock, for providing clock measurements indicating information about the clock; and a state filter, responsive to the clock measurements, for providing the estimate of the current state of the clock using a four-state clock model based on a two-state clock model providing a two-component state, with clock phase and clock fractional frequency as components, and a two-state measure of process noise covariance, the four-state clock model including a four-component state combining the two-component state with a clock error component and a clock error rate component, and including a measure of four-state process noise covariance.

In accord with the second aspect of the invention, the clock measurement may indicate information about the clock phase and clock fractional frequency. Further, the measure of process noise covariance may be a process noise covariance matrix, and the process noise covariance matrix may include as diagonal terms respective variances in the values for each of the four components of the four-component state.

The invention also provides a ranging receiver including a clock system in accord with the second aspect of the invention, the ranging receiver for use in conjunction with beacons of a positioning system, wherein the state filter is adapted for use in the ranging receiver, and wherein the state filter is further responsive to pseudoranges determined from signals provided by the beacons of the positioning system, and wherein the state estimated by the state filter includes the state of the clock as well as the state of the ranging receiver in respect to an aspect of the position of the ranging receiver as a function of time. Further, the clock measurement may indicate information about the clock phase and clock fractional frequency. Further still, the measure of process noise covariance may be a process noise covariance matrix, and the process noise covariance matrix may include as diagonal terms respective variances in the values for each of the four components of the four-component state. In some such applications, the state of the ranging receiver may include as components the clock phase component, the clock fractional frequency component, a clock error component, and a clock error rate component, and may also include either a position component or a velocity component indicating either the position or velocity of the ranging receiver, respectively. In other such applications, the four-state process noise covariance matrix may be based on a definition of a process noise covariance matrix Q given by, $$Q = E(w_k w_k^t)$$

where $E(\ldots)$ indicates taking the mathematical expectation of the indicated argument, and where the $w_k$ is a four-component vector indicating process noise. In still other such applications, the four-state process noise covariance matrix may be derived from a two-state process noise covariance for a two-state clock model in a way that preserves the components of the process noise covariance for the two-state clock model, regardless of the manner in which the components of the process noise covariance for the two-state clock model are defined. In still yet other such applications, the ranging receiver may include means for communicating with an external computing facility via wireless communication, and the external computing facility may perform at least some of the computation required to provide a navigation solution and so an estimate of the current state of the ranging receiver based on information the external computing facility receives from the ranging receiver via wireless communication. Finally, the invention also provides a system including a ranging receiver according to the invention for use in a positioning system, and also including the beacons of the positioning system.

Thus, the invention provides an improved model of clock behavior, one in which the conventional clock model states are appended by two more states to account for systematic shifts in frequency. Due to the enlarged state vector and still simple model (a linear model), the tracking of the clock improves. The invention expands the state vector, separately modeling the systematic shift.

With the invention, the quality of post-processing in a ranging receiver is improved, and the accuracy of the positioning provided by the ranging receiver is thereby improved. In addition, the invention allows accounting for how changes in temperature affect the operation of a clock.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention accounts for systematic error in a clock used in a ranging receiver, such as a receiver of signals from satellites of the Global Positioning System (GPS), in providing the state of the ranging receiver in respect to aspects of the motion of the ranging receiver, such as position and velocity of the ranging receiver. The invention does so by providing a clock model that is an extension of a conventional, two-state clock model. Systematic error here includes error caused by environmental factors, such as temperature. Before describing the clock model of the present invention, a conventional clock model used by a navigation filter of a ranging receiver (such as a GPS receiver) is described.

A Conventional (Two-state) Clock Model

In the prior art, clock modeling is performed using two sets of equations. The first set defines so-called state dynamics (where the ranging receiver is predicted to be based on a model of the motion of the receiver and based on values for the parameters of the model such as current position, current velocity and acceleration), and the second set relates the measurements (of current position and possibly velocity) to the states (position, velocity, acceleration, and possibly jerk). The conventional clock model for GPS receivers uses a two-state model (i.e. a model in which the clock state is represented by a two-component state vector). In continuous time, the state dynamics are described by the following differential equations:

$$\begin{bmatrix} \dot{x}_1(t) \\ \dot{x}_2(t) \end{bmatrix} = \begin{bmatrix} 0 & 1 \\ 0 & 0 \end{bmatrix} \begin{bmatrix} x_1(t) \\ x_2(t) \end{bmatrix} + \begin{bmatrix} f_1(t) \\ f_2(t) \end{bmatrix} \quad (1)$$

$$= \begin{bmatrix} x_2(t) \\ 0 \end{bmatrix} + \begin{bmatrix} f_1(t) \\ f_2(t) \end{bmatrix}$$

$$= x_2(t) f_1(t) + f_2(t)$$

where $x_1, x_2$ are the clock phase and fractional frequency (i.e. the change in frequency per unit frequency) respectively, and $f_1, f_2$ are noise components, i.e. are fluctuations in the time and fractional frequency due to random causes (such as environmental factors) and determine the process noise covariance matrix $Q_k$. (A clock phase measurement alone, at any instant of time, gives an estimate of clock time at the instant of time. Clock phase and clock fractional frequency measurements in combination, over a period of time, allow a filter, such as a Kalman filter, to provide a more precise value for clock time than clock phase alone (at the instant of time) would provide.) The measurement equation is simple for the clock, the measurement being simply the estimate of the time.

(A clock generator produces a waveform that in general can be represented by the following term:

$$A \sin[(\omega_0 t + \phi_0) + (\phi_e + \omega_e t + 2\pi d t^2/2) + x(t)]$$

in which the quantity $(\omega_0 t + \phi_0)$ represents the desired clock phase. The next term, $(\phi_e + \omega_e t + 2\pi d t^2/2)$, represents the causal phase error effects, where $\phi_e$ is a fixed phase error offset, and where $\omega_e$ is a frequency error that may be a function of one or another aspect of the clock's environment (e.g. temperature, magnetic field, acceleration, or pressure), and where the term, $2\pi d t^2/2$, represents a frequency drift or aging effect. The final term, $x(t)$, represents a random phase error. In analyzing these effects, the causal errors $(\phi_e + \omega_e t + 2\pi d t^2/2)$ are separated from the random phase error $x(t)$.)

In discrete time, the state equation is replaced by an equation relating the values of $x_1, x_2$ at one moment of time to their values after an increment of time (using as an increment the step size $\Delta t$) according to a process model formulated as, $$\begin{bmatrix} x_1 \\ x_2 \end{bmatrix}_{k+1} = \begin{bmatrix} 1 & \Delta t \\ 0 & 1 \end{bmatrix} \begin{bmatrix} x_1 \\ x_2 \end{bmatrix}_k + \begin{bmatrix} w_1 \\ w_2 \end{bmatrix}_k \quad (2)$$

$$= \Phi_k \vec{x}_k + \vec{w}_k$$

in which $\Phi_k$ is called the state transition matrix (the subscript k indicating that $\Phi_k$ depends on $\Delta t$, which, though not expressly indicated, depends on the subscript k in that $\Delta t = t_{k+1} - t_k$ and in general can be different for different k), and for which a (process noise) covariance matrix of the process noise (as opposed to the measurement noise) components $w_{1,k}, w_{2,k}$ is defined as $$Q_k = \begin{bmatrix} E(w_{1,k}^2) & E(w_{1,k} w_{2,k}) \\ E(w_{1,k} w_{2,k}) & E(w_{2,k}^2) \end{bmatrix} = E(\vec{w}_k \vec{w}_k^t), \quad (3)$$

(the notation $E(\ldots)$ indicating the operation of taking the mathematical expectation of the indicated argument, as in eq. (5) below) where $Q_k$ is a function of $\Delta t$ in that $w_{1,k}, w_{2,k}$ are each functions of $\Delta t$, which is made evident by the relationship between the noise components in continuous and discrete time, namely, $$w_k(\Delta t) = \int_0^{\Delta t} \Phi_k(\Delta t - \tau) f(\tau) d\tau, \quad \text{for } \Delta t = t_k - t_{k-1}. \quad (4)$$

Denoting $S_1, S_2$ as spectral amplitudes of $f_1, f_2$, in case of the simple process model given by equation (2), we have $$Q_k(\Delta t) = E(w_k w_k^t) \quad (5)$$

$$= \int_0^{\Delta t} \int_0^{\Delta t} \Phi_k(\Delta t - \tau) E(f(\tau) f(\sigma)^t) \Phi_k(\Delta t - \sigma) d\sigma d\tau$$

$$= \int_0^{\Delta t} \int_0^{\Delta t} \Phi_k(\Delta t - \tau) W \delta(\sigma - \tau) \Phi_k(\Delta t - \sigma) d\sigma d\tau$$

$$= \int_0^{\Delta t} \Phi_k(\Delta t - \tau) W \Phi_k(\Delta t - \tau) d\tau$$

$$= \int_0^{\Delta t} \begin{bmatrix} 1 & \Delta t - \tau \\ 0 & 1 \end{bmatrix} \begin{bmatrix} S_1 & 0 \\ 0 & S_2 \end{bmatrix} \begin{bmatrix} 1 & 0 \\ \Delta t - \tau & 1 \end{bmatrix} d\tau$$

$$= \begin{bmatrix} S_1 \Delta t + \frac{S_2 \Delta t^3}{3} & S_2 \frac{\Delta t^2}{2} \\ S_2 \frac{\Delta t^2}{2} & S_2 \Delta t \end{bmatrix}$$

For white noise, the spectral amplitudes $S_1, S_2$ can be expressed in terms of well known Allan variance parameters $h_i$; for example, the spectral amplitudes can be approximated as $$S_1 = 2h_0; \quad S_2 = 8\pi^2 h_{-2}.$$

A Clock Model Accounting for Systematic Error

The present invention differs from the prior art in how it models systematic changes (due to causal or deterministic factors) in a ranging receiver clock. The invention assumes that environmental factors (such as temperature), which are treated as random in the prior art, cause instead systematic changes in the performance of the receiver clock, thereby shifting the frequency of the clock. In doing so, however, although the present invention treats the error caused by the causal factors as deterministic over some interval of time, the invention nevertheless treats the error caused by the causal factors as random from one interval to the next, i.e. the invention assumes that from one interval to the next that the parameters representing the causal factors change randomly. If the "deterministic interval" adopted in practicing the invention (an interval that is adjustable) is for example five seconds, then the invention assumes that the parameter used to represent the causal factor affecting the clock remains constant, but changes, randomly, to some new value at the end of each such five-second interval.

According to the invention, for a ranging receiver, two kinds of systematic errors are incorporated into the clock model used by the ranging receiver, by assuming a systematic correction $y_s(t)$ given by, $$y_s(t) = a_0 + a_1 t \quad (6)$$

in which $a_0$ represents a constant frequency offset, and $a_1$ is a coefficient for aging. Both of these kinds of systematic errors are typically modeled in the invention as zero mean, Gaussian, random variables with known variances, and are taken to be independent of each other.

Incorporating the two systematic errors is done in a way that preserves the state-space formulation used in a Kalman filter navigation solution by a ranging receiver (or used in any other navigation solution that relies on more than the current measurement as a basis for providing current information about the motion of the ranging receiver). To incorporate the systematic errors represented by $a_0$ and $a_1$, the invention uses two additional state variables, an error state, $x_3$, (which could also be referred to as the error component of the four-component state vector x), and an error rate state, $x_4$, (state variables that are in addition to $x_1$ and $x_2$ of eq. (2)) defined as, $$x_3 = a_0 + a_1 t$$

$$x_4 = a_1 \quad (7)$$

so that $$\dot{x}_3 = a_1 = x_4, \text{ and } \dot{x}_4 = 0. \quad (8)$$

(The clock error component $x_3$ is more precisely termed a clock systematic fractional frequency bias, and the clock error rate component $x_4$ is more precisely referred to as a clock systematic fractional frequency error rate, but the terms clock error and clock error rate are used in the following description.) Thus $$\begin{bmatrix} \dot{x}_1 \\ \dot{x}_2 \\ \dot{x}_3 \\ \dot{x}_4 \end{bmatrix} = \begin{bmatrix} 0 & 1 & 1 & 0 \\ 0 & 0 & 0 & 0 \\ 0 & 0 & 0 & 1 \\ 0 & 0 & 0 & 0 \end{bmatrix} \begin{bmatrix} x_1 \\ x_2 \\ x_3 \\ x_4 \end{bmatrix} + \begin{bmatrix} f_1 \\ f_2 \\ f_3 \\ f_4 \end{bmatrix} \sim \dot{\vec{x}}(t) = \Phi \cdot \vec{x}(t) + \vec{f}(t). \quad (9)$$

In the corresponding discrete formulation, the process model is updated as follows:

$$\begin{bmatrix} x_1 \\ x_2 \\ x_3 \\ x_4 \end{bmatrix}_{k+1} = \begin{bmatrix} 1 & \Delta t & \Delta t & 0 \\ 0 & 1 & 0 & 0 \\ 0 & 0 & 1 & \Delta t \\ 0 & 0 & 0 & 1 \end{bmatrix} \begin{bmatrix} x_1 \\ x_2 \\ x_3 \\ x_4 \end{bmatrix}_k + \begin{bmatrix} w_1 \\ w_2 \\ w_3 \\ w_4 \end{bmatrix}_k \sim \vec{x}_{k+1} = \Phi_k \vec{x}_k + \vec{w}_k, \quad (10)$$

where $$Q(\Delta t) = E(w_k w_k^t) \quad (11a)$$

$$= \int_0^{\Delta t} \int_0^{\Delta t} \Phi(\Delta t - \tau) E(f(\tau) f(\sigma)^t) \Phi^t(\Delta t - \sigma) d\sigma d\tau$$

$$= \int_0^{\Delta t} \int_0^{\Delta t} \Phi(\Delta t - \tau) W \delta(\sigma - \tau) \Phi^t(\Delta t - \sigma) d\sigma d\tau$$

$$= \int_0^{\Delta t} \Phi(\Delta t - \tau) W \Phi^t(\Delta t - \tau) d\tau$$

which evaluates to, $$Q_k(\Delta t) = \int_0^{\Delta t} \begin{bmatrix} 1 & \Delta t - \tau & \Delta t - \tau & 0 \\ 0 & 1 & 0 & 0 \\ 0 & 0 & 1 & \Delta t - \tau \\ 0 & 0 & 0 & 1 \end{bmatrix} \quad (11b)$$

$$\begin{bmatrix} S_1 & 0 & 0 & 0 \\ 0 & S_2 & 0 & 0 \\ 0 & 0 & S_3 & 0 \\ 0 & 0 & 0 & S_4 \end{bmatrix} \begin{bmatrix} 1 & 0 & 0 & 0 \\ \Delta t - \tau & 1 & 0 & 0 \\ \Delta t - \tau & 0 & 1 & 0 \\ 0 & 0 & \Delta t - \tau & 1 \end{bmatrix} d\tau$$

resulting in, $$Q(\Delta t) = \begin{bmatrix} S_1 \Delta t + \frac{S_2 \Delta t^3}{3} + \frac{S_3 \Delta t^3}{3} & S_2 \frac{\Delta t^2}{2} & S_3 \frac{\Delta t^2}{2} & 0 \\ S_2 \frac{\Delta t^2}{2} & S_2 \Delta t & 0 & 0 \\ S_3 \frac{\Delta t^2}{2} & 0 & S_3 \Delta t + \frac{S_4 \Delta t^3}{3} & S_4 \frac{\Delta t^2}{2} \\ 0 & 0 & S_4 \frac{\Delta t^2}{2} & S_4 \Delta t \end{bmatrix}. \quad (11c)$$

The simple two-state model described by eq. (5) does not account for certain types of so-called flicker error, a type of random error. Many clock models modify the covariance matrix of eq. (5) to account for flicker. To account for random error such as flicker, the invention generalizes the systematic-shift correction described above so as to apply to the covariance matrix as modified by any of the prior art methods.

Representing the covariance matrix modified, according to any of the prior art methods, from the form given in eq. (5) so as to account for flicker, as, $$Q(\Delta t) = \begin{bmatrix} Q_{11} & Q_{12} \\ Q_{21} & Q_{22} \end{bmatrix}, \quad (12)$$

the invention provides an extended covariance matrix accounting for both flicker and two systematic errors given by, $$Q(\Delta t) = \begin{bmatrix} Q_{11} + \frac{S_3 \Delta t^3}{3} & Q_{12} & S_3 \frac{\Delta t^2}{2} & 0 \\ Q_{21} & Q_{22} & 0 & 0 \\ S_3 \frac{\Delta t^2}{2} & 0 & S_3 \Delta t + \frac{S_4 \Delta t^3}{3} & S_4 \frac{\Delta t^2}{2} \\ 0 & 0 & S_4 \frac{\Delta t^2}{2} & S_4 \Delta t \end{bmatrix}, \quad (13)$$

where the $Q_{11}$, $Q_{12}$, $Q_{21}$, and $Q_{22}$ are as in the modified (as in the prior art) covariance matrix given by eq. (12).

Now for a Kalman filer solution in case of measurements being linearly related to the state variable, and considering for the moment only a Kalman filter solution for the state of a clock, the measurement equation is written as, $$z_k = H x_k + v_k, \quad (14)$$

where, as in eq. (1), the $x_k$ are the (four-component) state variables ($x_1, x_2$ being the time and fractional frequency respectively, and $x_3, x_4$ being the error and error rate, respectively), the $Z_k$ are the (two) measured quantities (clock phase and clock fractional frequency), the $v_k$ are the (two-component) noise components, and the matrix H relates the state variables to the measured quantities. In practicing the invention, if only clock phase is measured, then H=[1 0 0 0], and if clock fractional frequency is measured as well, then $$H = \begin{bmatrix} 1 & 0 & 0 & 0 \\ 0 & 1 & 1 & 0 \end{bmatrix}.$$

If the clock is a subsystem of a larger system, e.g. a ranging receiver, then the measurement matrix is updated to include two additional rows, so as to accommodate additional states (state vector components) accounting for systematic clock error. Thus, if the measurement equation of the larger system is given by, $$z = Hx + v = \begin{pmatrix} * & * & * & * & h_{1,s} & h_{1,s+1} \\ * & * & * & * & h_{1,s} & h_{1,s+1} \\ * & * & * & * & h_{1,s} & h_{1,s+1} \\ * & * & * & * & h_{1,s} & h_{1,s+1} \\ * & * & * & * & h_{1,s} & h_{1,s+1} \\ * & * & * & * & h_{1,s} & h_{1,s+1} \\ * & * & * & * & h_{1,s} & h_{1,s+1} \\ * & * & * & * & h_{1,s} & h_{1,s+1} \end{pmatrix} \begin{pmatrix} * \\ * \\ * \\ * \\ * \\ x_1 \\ x_2 \end{pmatrix} + v, \quad (15)$$

(dropping for the moment the subscript k indicating a particular instant of time), then it is updated to include systematic error components as follows:

$$z = Hx + v = \begin{pmatrix} * & * & * & * & h_{1,s} & h_{1,s+1} & h_{1,s+1} & 0 \\ * & * & * & * & h_{2,s} & h_{2,s+1} & h_{1,s+1} & 0 \\ * & * & * & * & h_{31,s} & h_{3,s+1} & h_{1,s+1} & 0 \\ * & * & * & * & h_{4,s} & h_{4,s+1} & h_{1,s+1} & 0 \\ * & * & * & * & h_{5,s} & h_{5,s+1} & h_{1,s+1} & 0 \\ * & * & * & * & h_{6,s} & h_{6,s+1} & h_{1,s+1} & 0 \\ * & * & * & * & h_{7,s} & h_{7,s+1} & h_{1,s+1} & 0 \\ * & * & * & * & h_{8,s} & h_{8,s+1} & h_{1,s+1} & 0 \end{pmatrix} \begin{pmatrix} * \\ * \\ * \\ * \\ x_1 \\ x_2 \\ x_3 \\ x_4 \end{pmatrix} + v, \quad (16)$$

i.e. two additional columns of H and two additional components of x are provided, with the measurement vector z and the measurement noise vector v staying the same as before.

In a ranging receiver application (i.e. for a clock system according to the invention used in a ranging receiver), the actual measurements made are pseudoranges) along with clock phase, and these can be used to provide a so-called point solution for position, velocity and time (PVT) (called a point solution because only a single, current measurement, at a single point in time, is used in provided a solution); the point solution values become the values of the "measurements" z in eq. (14). In such an approach, point solutions are provided at successive instants of time and an ordinary Kalman filter then uses them as "measurements" in determining a current best estimate of the state variable x (a smoothed estimate). In addition, however, the clock model of the present invention can also be directly incorporated into a filter (an ordinary Kalman filter, an extended Kalman filter, or other filters that rely on more than a current measurement as the basis for an estimate of the current state of the subject object) by including the clock model per eqs. (10), (13), and (14) into the model for the larger system and updating the measurement equation as illustrated by eq. (16). When the clock model is directly incorporated into a ranging receiver application, the indirect measurements (such as pseudorange and delta-pseudorange) are used to estimate the clock parameters along with position, velocity, etc. In other words, the clock signals indicating clock phase and fractional frequency are provided to a filter (such as an extended Kalman filter) only indirectly in case of directly incorporating the clock model; i.e. a baseband processing module uses clock signals to figure the pseudoranges from raw signals provided by beacons of the positioning system, and so the clock measurements are implicit in the pseudoranges and never provided explicitly to the filter.

(An example of a filter with which a clock model according to the invention can be used is given in co-owned, co-pending U.S. application Ser. No. 09/444,840, entitled METHOD AND APPARATUS FOR FILTERING MEASUREMENTS USED IN A GENERALIZED POSITIONING SYSTEM, filed on Nov. 22, 1999, hereby incorporated by reference.)

In practicing the invention, the temperature is assumed to remain fixed during a fixed interval that is a parameter of the model. The fixed interval could be larger than the measurement interval; the size of the fixed interval is a design decision. The finest interval is usually that between measurements, but even there, longer intervals could be used.) Any change in the temperature is assumed to occur at the ends of each fixed interval. After the temperature is updated at the end of an interval to reflect any changes that occurred during the interval, the systematic error component is determined for the next interval and is kept fixed until the end of the next interval. Thus, the terms in the Q matrix due to the systematic errors ($S_3, S_4$) are set to zero within the intervals, and are set to nonzero values only at the ends of the intervals.

The inventor has conducted numerical simulations using arbitrary variances to investigate the effectiveness of the invention. The inventor observed that with temperature compensation according to the invention, measurement and tracking errors remained within a fixed range, whereas when temperature change was not accounted for, the clock error grew over time, and the tracking errors varied over a substantially larger range, growing first continually in one direction and then continually in another direction. (The measurement errors of course were unaffected by not accounting for the temperature changes, because a measurement error is an error in determining what the clock reading is, not what the clock reading should be).

Figure 1:
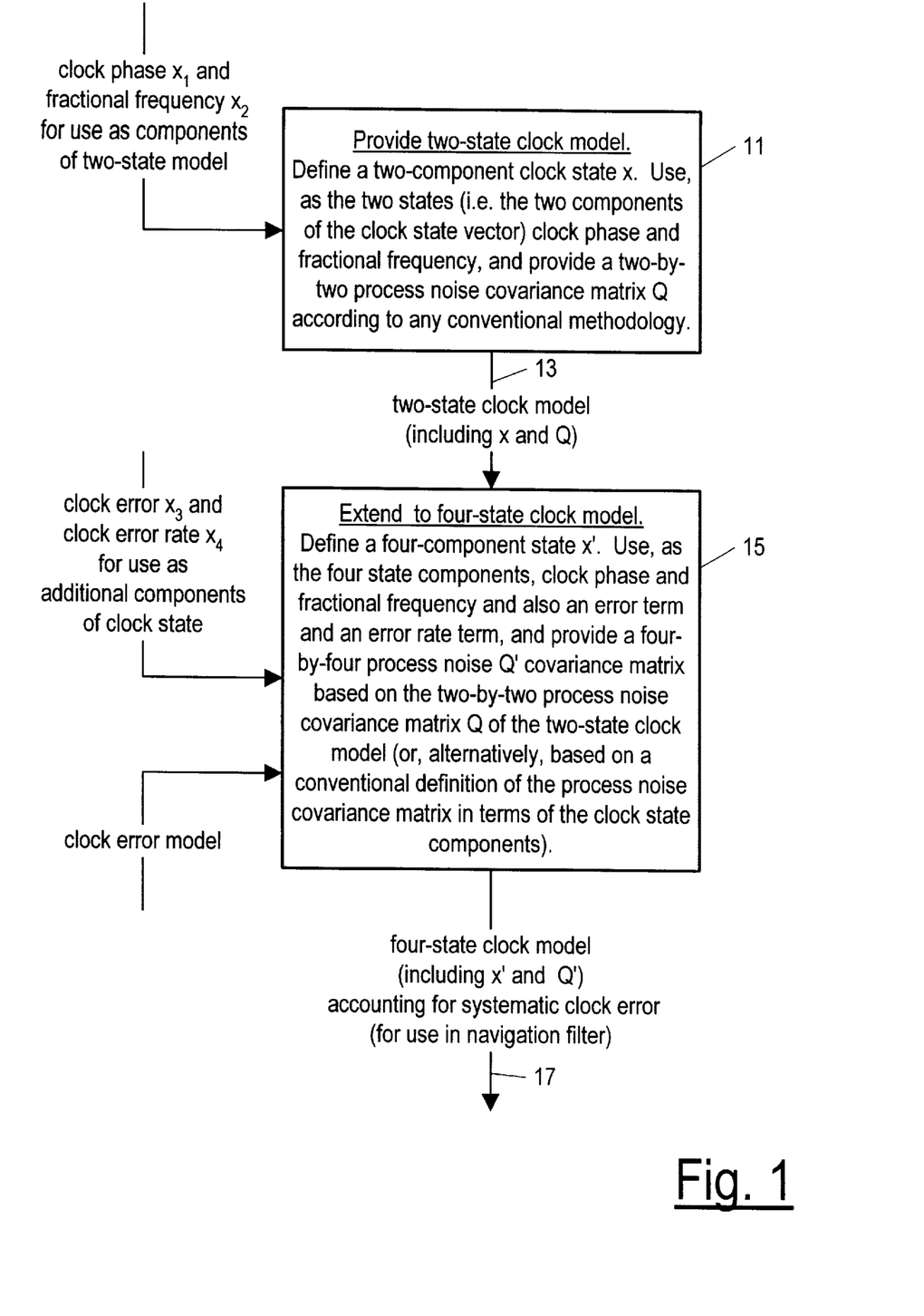
FIG. 1 is flowchart indicating how to construct a four-state clock model (accounting for systematic error in a clock) according to the invention.

Referring now to FIG. 1, a flowchart is provided indicating how to make the invention, i.e. a method for providing a clock model for use for example in a navigation filter of a ranging receiver. It should be understood that the invention, in essence a clock system including a clock and a state filter (such as a Kalman filter), can be used in other applications besides a ranging receiver. Any application where knowledge of the state of a clock (i.e. at least the clock time) is needed is a candidate application for a clock system according to the invention.

Referring still to FIG. 1, according to the invention, a method for making a two-clock model includes a first step 11 of providing a two-state clock model 13, based on clock time $x_1$ and clock fractional frequency $x_2$ as components of a two-component state vector x (eq. 2) indicating the state of the clock. The two-state model is defined to include a two-by-two process noise covariance matrix Q (eq. 3) based on the two-component state x. Making the invention also includes a next step 15 of providing a four-state clock model 17 using a four-component state vector including the same two components used in the two-state clock model and also using two additional components, an error component $x_3$ and an error rate component $x_4$, and also based on a model for systematic error as indicated for example by eq. (6) (giving rise to eq. (7)). (The values of $a_0$ and $a_1$ of eq. (6) are never expressly determined or given, but can be inferred from the estimates for $x_3$ and $x_4$, even though $x_4$ is in fact simply $a_1$; eq. (6) plays the role of a motion model used in predicting future error and error rate. Additionally, no direct measurements of $x_4$ are made even in case of a standalone clock, not embedded in a larger application such as a ranging receiver application.)

Thus, the four-state clock model is to include a four-component state vector (see eq. (10)) indicated here as x' to distinguish it from the two-component state vector x of the two-state model. The four-state clock model is to also include a four-by-four process noise matrix (see eq. (11)) indicated here as Q' to distinguish it from the two-by-two (or two-state) process noise covariance matrix Q of the two-state clock model (given by eq. (3) in general, or by eq. (5) in case the two-state clock model uses the simple process model given by eq. (2)). Thus, the four-state process noise covariance matrix Q' is as given by eq. (11c) in case of the two-state clock model using eq. (2), but in general given by eq. (13).

Figure 2:
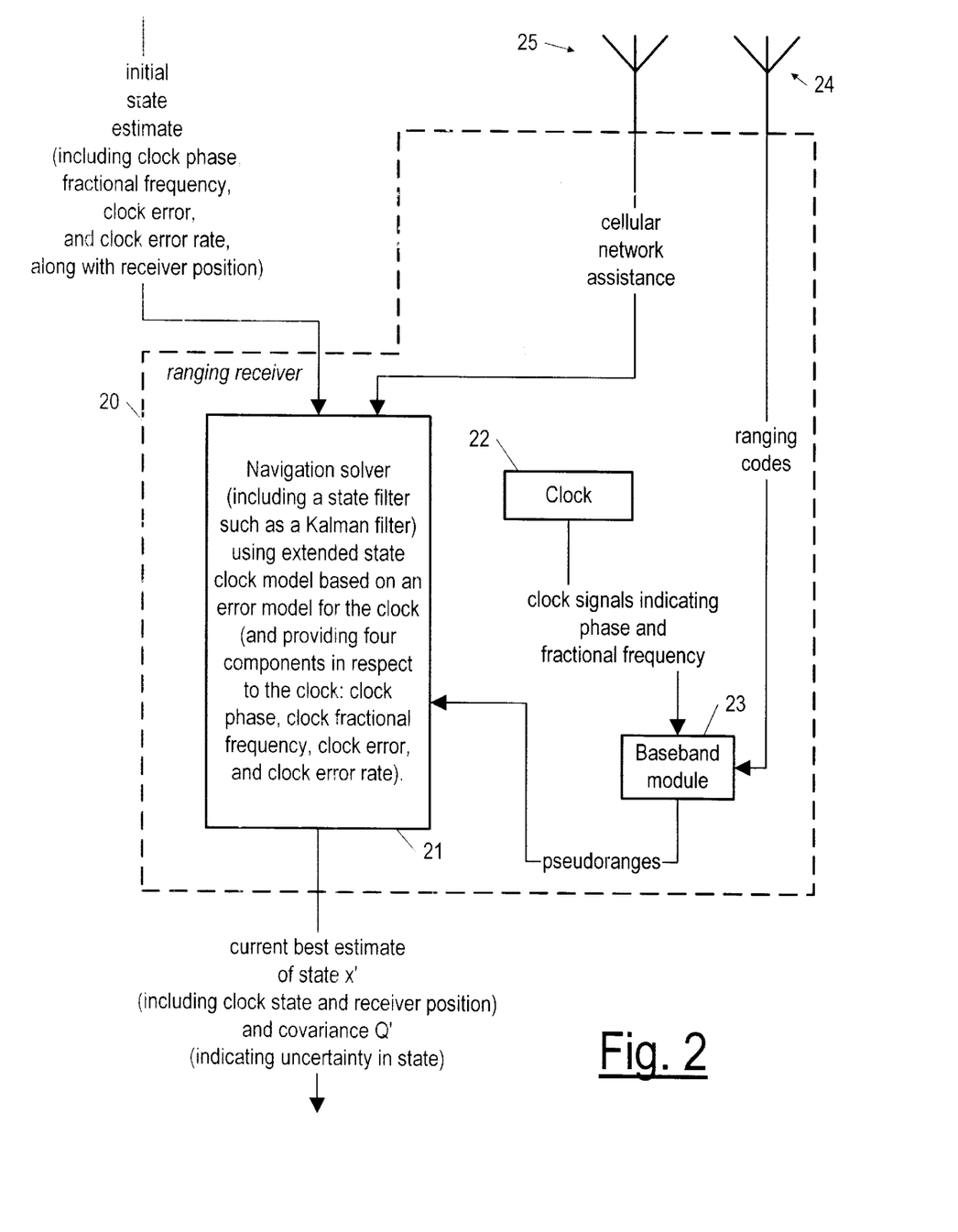
FIG. 2 is a block diagram of aspects of a ranging receiver using a navigation filter that in turn uses a state filter (such as a Kalman filter) adapted to a four-state clock model according to the invention.

Referring now to FIG. 2, the invention is shown as a ranging receiver 20 for providing a current best estimate of the state of the ranging receiver in response to ranging codes transmitted by beacons of a positioning system (the state of the ranging receiver indicating one or more aspects of the motion of the ranging receiver, such as position, or velocity, or acceleration). The ranging receiver includes, among other components, a navigation solver 21 including a state filter such as a linearized Kalman filter (i.e. a so-called extended Kalman filter) or any other type of filter that relies on more than simply a current measurement for providing a state estimate (including for example the clock time and receiver position), a baseband module 23, for providing pseudor-anges extracted from ranging codes transmitted by beacons of a positioning system (GPS satellites being one example of such beacons), and a clock for providing signals (indirectly, implicit in the pseudoranges) indicating the clock phase and a clock fractional frequency. The ranging codes are received by the baseband module 23 via a ranging antenna 24. In addition, to allow for assistance by an external computing facility in providing a navigation solution, the ranging receiver 20 also includes not only the ranging antenna 24, but also a cellular antenna 25 by which the external computing facility can receive from the 20, ranging receiver information needed to provide a navigation solution, and then provide back to the ranging receiver navigation solution corresponding to the received information.

The clock phase and fractional frequency are the clock measurements z (which are related to the state vector x' according to eq. (14) only in case of using a single-point solution to provide PVT solutions that serve as "measure-ments" for an ordinary Kalman filter, but are, in general, convolved with the other measurements, as explained above). The navigation solver 21 uses the pseudoranges and clock measurements z (see eq. (14)), along with an initial estimate of the state of the ranging receiver (an initial position estimate and/or initial velocity estimate, and an initial estimate of the state of the clock including four components: clock phase, clock fractional frequency, clock error (i.e. clock systematic fractional frequency bias) and clock error rate (i.e. clock systematic fractional frequency error rate), as indicated in FIG. 2), and also a model for clock error and clock error rate based on a constant offset parameter $a_0$ and a constant aging parameter a, as in eq. (6), for providing the current best estimate of the state of the ranging receiver using a four-state clock model, based on a two-state clock model providing a two-by-two process noise covariance matrix, augmented to include an error component $x_3$ and also an error rate component x4, and also to include the four-by-four (or four-state) process noise Q' covariance matrix based on the two-by-two (or two-state) process noise covariance matrix Q of the two-state clock model.

Figure 3:
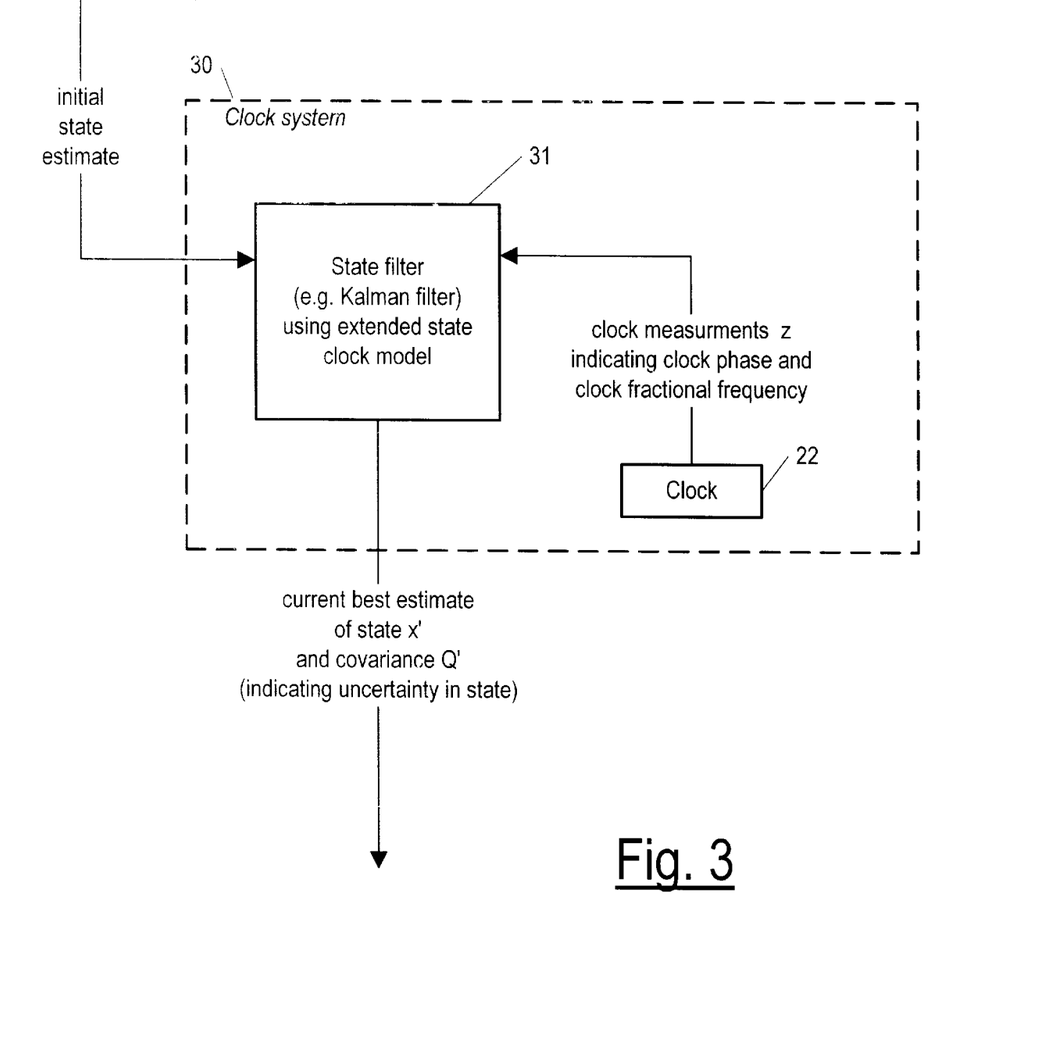
FIG. 3 is a block diagram of a clock system according to the invention (and so using a state filter adapted to use a four-state clock model according to the invention)

Referring now to FIG. 3, the invention is shown more generally as a clock system 30 (independent of the use of the clock except that the clock measurements are related to the clock state variously, depending on the use of the clock, as explained above in connection with use by a ranging receiver), including a clock 22 and a state filter 31 (such as a Kalman filter, or any filter that uses a combination of current and past measurement information and a predicted value for a current state to arrive at a best estimate of the current state of a subject system). The clock 22 provides signals indicating the clock phase and a clock fractional frequency. The state filter 31, treating the clock signals as measurements z, uses the clock signals along with an initial estimate of the state of the clock, for providing the current best estimate of the state of the clock using a four-state clock model, based on a two-state clock model providing a two-by-two process noise covariance matrix, and also based on a model for clock error given by eq. (6), with the four-state clock model including the four-component state vector x' combining the two-component state vector x with an error component $x_3$ and an error rate component $X_4$, and also including the four-state process noise Q' covariance matrix based on the two-state process noise covariance matrix Q of the two-state clock model (or based on a conventional definition of the process noise covariance matrix Q as given by eq. (11a), i.e. by, $$Q(\Delta t) = E(w_k w^t_w)$$

where E( ... ) indicates taking the mathematical expectation of the indicated argument).

Figure 4:
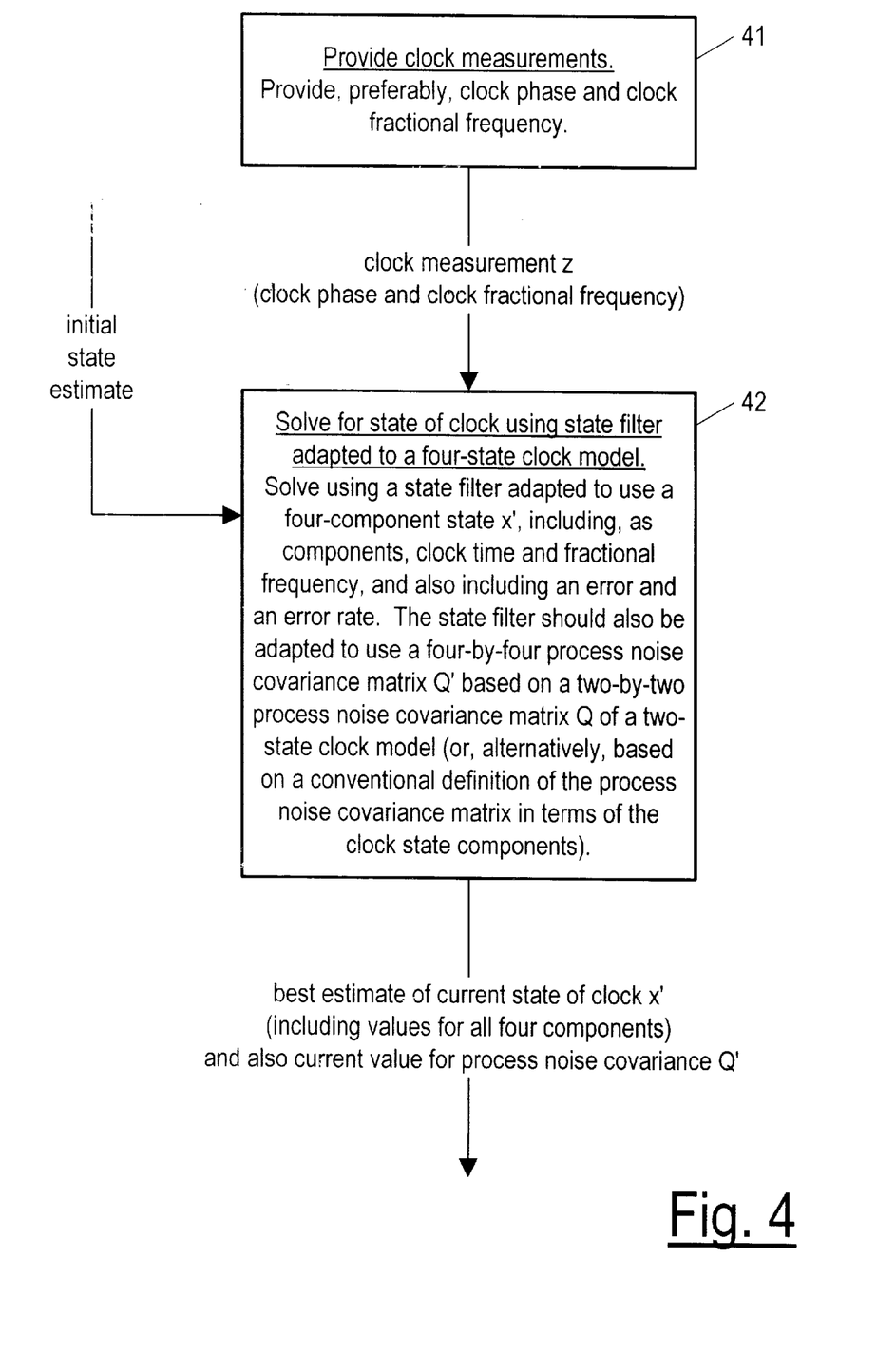
FIG. 4 is a flowchart of a method for providing the state of a clock in a way that accounts for systematic error by using a state filter adapted to use a four-state clock model according to the invention).

Referring now to FIG. 4, the invention is shown as a method, corresponding to the apparatus indicated in FIG. 3, for providing a best estimate of the state of a clock (i.e. at least the clock time) including a first step 41 of providing measurements z indicating, preferably, clock phase and clock fractional frequency. The method also includes a next step 42, responsive to the measurements z and also responsive to values for systematic error terms (a clock error and a clock error rate), the next step then solving for the state of the clock using a state filter adapted to a four-state clock model. In solving for the state of the clock, a state filter should be used that is adapted to use a four-component state x', including, as components, clock time and fractional frequency, and also including an error component and an error rate component, the error components being estimated using a model given by an equation of the form of eq. (6). The state filter should also be adapted to use a four-state process noise Q' covariance matrix based on a two-state process noise covariance matrix Q of a two-state clock model (or, alternatively, based on a conventional definition of the process noise covariance matrix in terms of the clock state components). The method provides a best estimate of the current state of the clock x' (including values for all four components) and also a current value for the process noise covariance Q'.

SCOPE OF THE INVENTION

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A method of providing an estimate of a current state of a clock having a clock phase indicating a value for time, the method comprising:

a) a step (41) of providing a clock measurement (z) indicating information about the clock; and    b) a step (42), responsive to the clock measurement (z), for determining the estimate of a current state of the clock using a state filter adapted to use a four-component state (x') including as components a clock phase component and a clock fractional frequency component, and also including a clock error component and a clock error rate component, and further adapted to use a measure of four-state process noise covariance (Q').

2. A method as in claim 1, wherein the clock measurement (z) indicates information about the clock phase and clock fractional frequency.

3. A method as in claim 2, wherein the measure of process noise covariance (Q') is a process noise covariance matrix (Q'), and wherein the process noise covariance matrix (Q') includes as diagonal terms respective variances in the values for each of the four components of the four-component state (x').

4. A method as in claim 3, wherein the four-state process noise covariance matrix (Q') is based on a definition of a process noise covariance matrix Q given by, $$Q = E(w_k w_k^t)$$

where $E(\ldots)$ indicates taking the mathematical expectation of the indicated argument, and where the $w_k$ is a four-component vector indicating process noise.

5. A method as in claim 3, wherein the four-state process noise covariance matrix (Q') is derived from a two-state process noise covariance (Q) for a two-state clock model in a way that preserves the components of the process noise covariance (Q) for the two-state clock model, regardless of the manner in which the components of the process noise covariance (Q) for the two-state clock model are defined.

6. A method as in claim 2, wherein the state (x') of the ranging receiver includes as components the clock phase component, the clock fractional frequency component, the clock error component, and the clock error rate component, and also includes either a position component or a velocity component indicating either the position or velocity of the ranging receiver, respectively.

7. A method as in claim 1, wherein the step (42) for determining the estimate of a current state of the clock is performed as part of a step of providing an estimate of a current state (x') of a ranging receiver used in conjunction with beacons of a positioning system, and wherein the method further comprises a step of providing pseudoranges from the beacons of the positioning system.

8. A clock system (30) for providing an estimate of a current state of a clock (22); the clock system comprising:
 a) the clock (22), for providing clock measurements (z) indicating information about the clock; and
 b) a state filter (31), responsive to the clock measurements (z), for providing the estimate of the current state of the clock using a four-state clock model based on a two-state clock model providing a two-component state (x), with clock phase and clock fractional frequency as components, and a two-state measure of process noise covariance (Q), the four-state clock model including a four-component state (x') combining the two-component state (x) with a clock error component and a clock error rate component, and including a measure of four-state process noise covariance (Q').

9. A clock system (30) as in claim 8, wherein the clock measurement (z) indicates information about the clock phase and clock fractional frequency.

10. A clock system (30) as in claim 9, wherein the measure of process noise covariance (Q') is a process noise covariance matrix (Q'), and wherein the process noise covariance matrix (Q') includes as diagonal terms respective variances in the values for each of the four components of the four-component state (x').

11. A ranging receiver (20) including a clock system (30) as in claim 8, the ranging receiver for use in conjunction with beacons of a positioning system, wherein the state filter (31) is adapted for use in the ranging receiver (20), and wherein the state filter (31) is further responsive to pseudoranges determined from signals provided by the beacons of the positioning system, and wherein the state (x') estimated by the state filter (31) includes the state of the clock (22) as well as the state of the ranging receiver (20) in respect to an aspect of the position of the ranging receiver as a function of time.

12. A ranging receiver (20) as in claim 11, wherein the clock measurement (z) indicates information about the clock phase and clock fractional frequency.

13. A ranging receiver (20) as in claim 12, wherein the measure of process noise covariance (Q') is a process noise covariance matrix (Q'), and wherein the process noise covariance matrix (Q') includes as diagonal terms respective variances in the values for each of the four components of the four-component state (x').

14. A ranging receiver (20) as in claim 13, wherein the state (x') of the ranging receiver includes as components the clock phase component, the clock fractional frequency component, a clock error component, and a clock error rate component, and also includes either a position component or a velocity component indicating either the position or velocity of the ranging receiver, respectively.

15. A ranging receiver (20) as in claim 13, wherein the four-state process noise covariance matrix (Q') is based on a definition of a process noise covariance matrix Q given by, $$Q = E(w_k w_k^t)$$

where $E(\ldots)$ indicates taking the mathematical expectation of the indicated argument, and where the $w_k$ is a four-component vector indicating process noise.

16. A ranging receiver (20) as in claim 13, wherein the four-state process noise covariance matrix (Q') is derived from a two-state process noise covariance (Q) for a two-state clock model in a way that preserves the components of the process noise covariance (Q) for the two-state clock model, regardless of the manner in which the components of the process noise covariance (Q) for the two-state clock model are defined.

17. A ranging receiver (20) as in claim 13, wherein the ranging receiver includes means (25) for communicating with an external computing facility via wireless communication, and wherein the external computing facility performs at least some of the computation required to provide a navigation solution and so an estimate of the current state (x') of the ranging receiver based on information the external computing facility receives from the ranging receiver via wireless communication.

18. A system, comprising a ranging receiver (20) as in claim 11, and further comprising the beacons of the positioning system.

* * * * *

UNITED STATES PATENT AND TRADEMARK OFFICE
CERTIFICATE OF CORRECTION

PATENT NO. : 6,573,799 B1
DATED : June 3, 2003
INVENTOR(S) : David Akopian

It is certified that error appears in the above-identified patent and that said Letters Patent is hereby corrected as shown below:

Column 7,
Line 58, (equation 11b) "$Q_K$" should be -- Q --.

Column 8,
Line 52, "the $Z_k$ are" should read -- the $z_k$ are --.

Column 11,
Line 33, "can receive from the 20, ranging" should be -- can receive from the ranging --.
Line 54, "aging parameter a, as in" should be -- aging parameter $a_1$ as in --.
Line 58, "error rate component x4, and" should be -- error rate component $x_4$, and --.

Column 12,
Line 15, "error rate component $X_4$, and" should be -- error rate component $x_4$, and --.
Line 22, in the equation: "$w^t_w$" should be -- $w^t_k$ --.

Signed and Sealed this

Thirtieth Day of September, 2003

JAMES E. ROGAN
*Director of the United States Patent and Trademark Office*